United States Patent [19]

Lloyd et al.

[11] Patent Number: 4,738,531

[45] Date of Patent: Apr. 19, 1988

[54] DISTRIBUTED ANTENNA ARRAY LOCATION APPARATUS

[75] Inventors: Wayne B. Lloyd, Baltimore; John J. Chino, Arnold, both of Md.

[73] Assignee: Westinghouse Electric Corp., Pittsburgh, Pa.

[21] Appl. No.: 821,718

[22] Filed: Jan. 23, 1986

[51] Int. Cl.⁴ .......... G01B 11/26; G01C 1/00; G01P 3/36

[52] U.S. Cl. .......... 356/152; 356/141; 356/150

[58] Field of Search .......... 356/152, 141, 5, 28.5, 356/28, 153, 150; 250/203 R; 342/25, 91

[56] References Cited

U.S. PATENT DOCUMENTS

| | | |
|---|---|---|
| 3,232,164 | 2/1966 | Kern et al. . |
| 3,326,076 | 6/1967 | Burg . |
| 3,375,750 | 4/1968 | Ellis et al. . |
| 3,603,691 | 9/1971 | Hamilton . |
| 3,694,089 | 9/1972 | Rantsch .......... 356/152 |
| 3,816,000 | 6/1974 | Fiedler . |
| 3,942,894 | 3/1976 | Maier .......... 356/153 |
| 3,990,796 | 11/1976 | Foltz, Jr. . |
| 4,243,877 | 1/1981 | Cruz . |
| 4,283,688 | 8/1981 | Lloyd et al. .......... 356/153 |

Primary Examiner—Stephen C. Buczinski
Assistant Examiner—Melissa L. Koltak
Attorney, Agent, or Firm—W. E. Sutcliff

[57] ABSTRACT

An apparatus for measuring a comprehensive state of vector displacement between a group of at least two pairs of longitudinally spaced side-looking radar arrays mounted upon a flexible host vehicle. This apparatus will operate to measure in three linear translation motions and three rotational motions, the relative positions of the radar array antennas upon the host vehicle during maneuvers of the host vehicle.

10 Claims, 7 Drawing Sheets

DISTRIBUTED ANTENNA ARRAY LOCATION APPARATUS

BACKGROUND OF THE INVENTION

1. Field of the Invention:

The present invention relates to an apparatus for measuring the comprehensive state of vector displacement between a group of at least two pairs of longitudinally spaced side-looking radar arrays on a flexible host vehicle.

Figure 1:
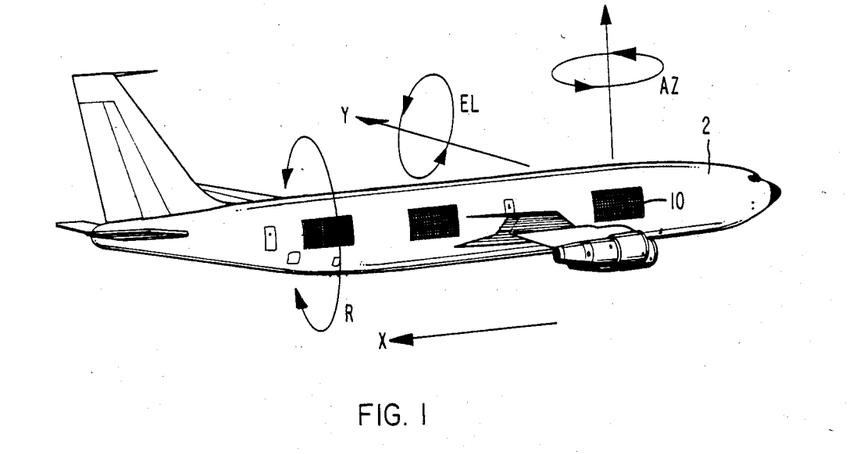
FIG. 1 is a representation of an airplane in flight, mounted with distributed radar antenna arrays. Also shown are the six directions or degrees of freedom to be evaluated.
Figure 2:
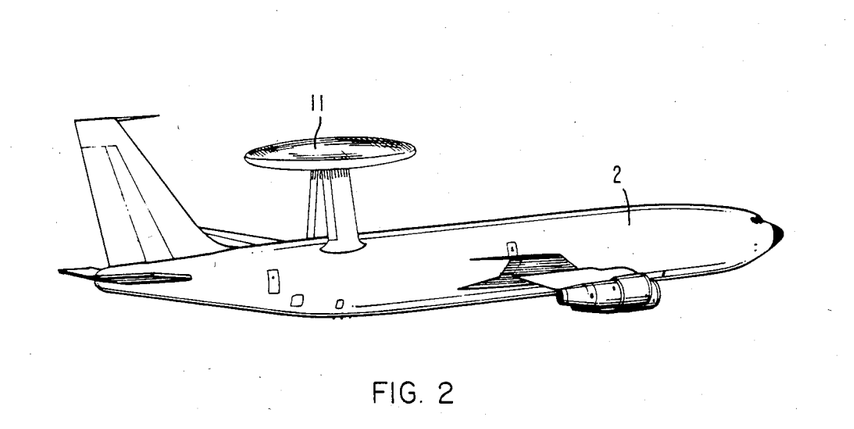
FIG. 2 is a conventional aircraft with a non-conformally mounted radar antenna as would be utilized to search for low flying aircraft.

2. Description of the Prior Art:

Distributed antenna arrays as shown in FIG. 1 refer to the application of several arrays on various portions of the same host vehicle. These various arrays could be either conformal in architecture or planar behind conformal radomes. One of the advantages of a distributed array concept over the more conventional single antenna array is the ease of integration into the host vehicle. This is due to the increased flexibility created by the placement of multiple small arrays instead of the intergration of a single large antenna. Another potential advantage of distributed arrays is the possibility of increased radar coverage for the host vehicle. FIG. 2 is an example of the conventional approach to the radar antenna on a host vehicle. The example here is the AWACS airplane with a non-conformal radar antenna located within a radome located at the top of the aircraft. However, this utilization of a single antenna not fully integrated into the body of the airplane results in increased radar cross-section and increased drag resulting in a decrease of "time on station". The term "time on station" refers to the amount of time that the aircraft can cruise on its surveillance mission. A greater amount of drag is experienced by the airplane with a single radar antenna not fully integrated into the body of the airplane. Increased drag decreases the amount of time that the airplane can be in the air performing its radar scanning function.

Each of the arrays for a distributed array concept as described in this application are either conformal which means they conform to the outside skin of the host vehicle in nature, or are planar in nature behind conformal radomes. It is necessary, however, that each of the arrays be accurately located relative to an inertial frame of reference. This accuracy of loction is required because relative motion exists between each of the antennas due to structural flexure experienced by portions of the same host vehicle during flight.

The problem to be solved then is a mechanism or apparatus that will measure three linear translational motions, and three rotational motions for each of three groups of distributed antenna arrays. The three linear translational motions in a Newtonian coordinate system are traditionally designated as X, Y and Z. The three rotational motions in a Newtonian system are usually characterized by azimuth, elevation and roll. We will utilize the Newtonian refernce coordinate system in this application where X, Y and Z will define the three linear translational motions; and azimuth will refer to rotation about the Z axis, elevation will refer to rotation about the Y axis, and roll or R will refer to rotation about the X axis. The utilization of an antenna array system distributed about a host vehicle is also be applicable to an aircraft carrier or any other larger vehicular means wherein flexure or structural changes occur during the operation of the host vehicle impacting the relative positions of the radar antenna arrays. Generally speaking, six degree of freedom motion will not be experienced by all the arrays on a particular host vehicle because there will be indigenous structural constraints of the aircraft vessel that will not permit motion in all six degrees of freedom. In these instances, the apparatus as taught by this application can obviously be simplified in those situations.

A brief description of the preferred embodiment of this application is a laser/sensor alignment mechanism or apparatus having laser autocollimators or telescopes for measuring three linear translational motions and three rotational motions for each of three arrays of a distributed antennl array system on a host vehicle. This apparatus would have a first station with an alignment feature or reference, a laser source and four optical instruments utilizing the laser source by means of beam splitters and turning mirrors. These four instruments would transmit the beams to appropriate retroreflectors at a second station. The returns from these reflectors are then used to derive measurement signals in six degrees of freedom. This second station is also equipped with a similar laser and sensor package to reflect beams from retroreflectors on a third station to measure six degrees of freedom of the third station with respect to the second station.

This is a passive system as defined by the lack of correctional opportunities afforded the arrays after the determination that they are out of alignment. An active system would be defined as a gimballed system or a system that makes correctional changes in the position of the antenna arrays after the determination that there is indeed misalignment between the inertial reference point and the antenna array stations. A careful review of the prior art revealed the utilization of an active system as taught by U.S. Pat. No. 4,283,688 to Wayne B. Lloyd, et al., dated Aug. 11, 1981, entitled "Laser Auto Alignment System". In this U.S. patent, an auto alignment system for a laser having a pair of reflector assemblies capable of providing six degrees of freedom of movement to the reflector elements formed as a part of each of the reflector systems is taught. During the utilization of the system, that interconnection between the reflector unit and a gimballed knuckle joint provides for two degrees of freedom while the translational mechanism and its interconnection with the gimbal knuckle provides an additional four degrees of freedom. This auto alignment system maintains the correct relationship between the reflecting elements of the laser as well as providing a cooling mechanism thereof. This active system is distinct from the preferred embodiment of this application because of its capability of realigning the retroreflector and after its termination of misalignment. This is commonly referred to in the art as a Benchless Laser system.

The preferred embodiment of this application resolves the problem of high drag and resultant decreased time on station. It also provides a reduced radar cross-sectional area through the utilization and determination of the alignment radar antenna arrays all located upon a single host vehicle.

SUMMARY OF THE INVENTION

This apparatus consists of laser autocollimators, laser interferometers, and alignment telescopes. These designs more than satisfy the general design requirements regarding the maximum motion that each antenna may have relative to an inertial frame of reference. These design requirements relate to quantifying the allowable six degrees of freedom of motion in the Newtonian coordinate system that each antenna may experience relative to some inertial frame of reference. These general design requirements are approximately 1/32 of the antenna beam wavelength in linear translation, i.e., the X, Y and Z coordinates and one milliradian in the angular rotation, i.e. azimuth, elevation and rotation. If we permit the frequency to be 18 gigahertz which is $18 \times 10^9$ cps, the wavelength $\lambda$ is determined to be 0.65 inches, hence $1/32\lambda = 0.020$ inches. FIG. 1 illustrates the general system design approach where six arrays are located on the same host vehicle. In this instance, the host vehicle is an airplane. There are three arrays located on each side of the host vehicle for a total of six arrays. Line-of-sight for all of these arrays is a luxury that obviously will not be the case for all installations, but to more clearly illustrate this principle, line-of-sight will be considered here. If line-of-sight does not exist, gimballed mirrors could be incorporated into the design. It is assumed in the description of this apparatus that each pair of arrays can be tied or fixed to each other as shown in FIG. 3.

Figure 3:
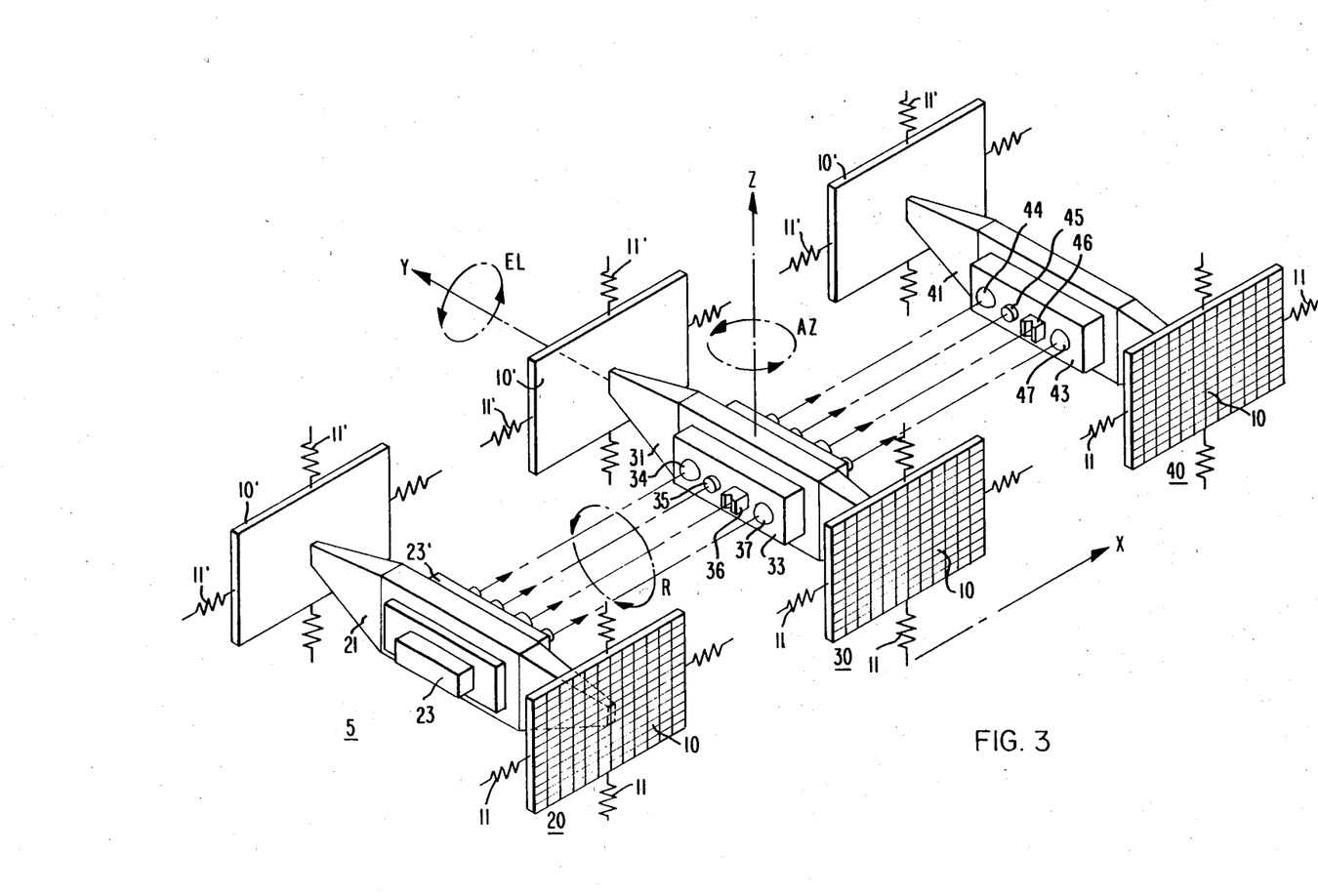
FIG. 3 is an orthogonal view of the distributed antenna array location apparatus.
Figure 4:
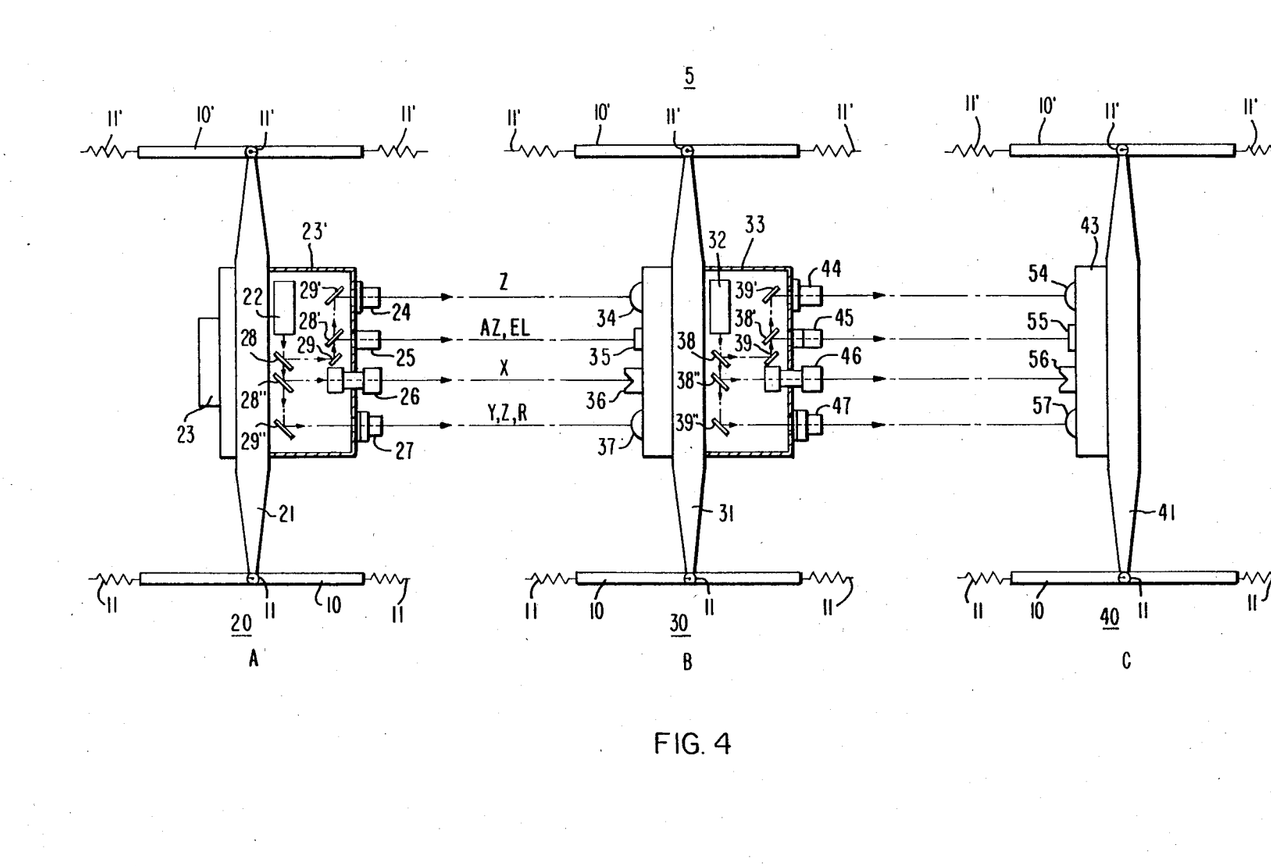
FIG. 4 is a cross-section view of the distributed antenna array location apparatus.

FIG. 3 is one embodiment of this application. It comprises three stations interconnected by the laser beams issuing from the first station and second station reflected by the second station and the third station. Perpendicular to each set of laser generating and laser emitting devices are the antenna arrays themselves. For example, as illustrated in FIG. 3 there are six arrays. We have shown in FIG. 3, the X, Y and Z axes which will be our linear coordinate system and we have also shown roll rotation about the X axis, elevation about the Y axis and azimuth about the Z axis as our rotational direction constraints. This entire system will be dependent upon an IMU or inertial measurement unit which will be located upon the first station. This inertial measurement unit will utilize a fixed astronomical star to ascertain its point of reference. The other consecutive stations, all upon the same optical axis with as first station, will then reflect the laser beam energy back to the first station and previous emitting stations to show to the laser emitting subsystems like the laser autocollimator, laser interferometer and laser telescopes variations in the X, Y, Z azimuth elevation and roll rotation frames of reference. Briefly stated, the operation of the configuration as shown in FIG. 3 is as follows. An inertial measurement unit or IMU or any other equivalent inertial refernce system is attached to the first station, station A, which gives true pointing data relative to a star fixed reference for this station. This pointing data can be used in system computations involving radar signal processing. This station A will also be equipped with a laser source and four optical instruments which use this common source by means of beam splitters and mirrors as indicated in FIG. 4. The instruments on the station A will project laser beams to appropriate retroreflectors on station B. The returns from these retroreflectors are then used to derive measurement signals of the displacement of station B with respect to station A in the six degrees of freedom. In specific, two instruments designated alignment telescopes have beams which appear on curved convex reflectors and hence are sensitive to translation in the Y and Z linear directions. The laser interferometers with a cube corner retroreflector will be suitable for direct measuremnt of relative displacement in the X direction. Thus, the three required translational degrees of freedom in a linear direction can be measured. The laser autocollimator with a planar retroreflector is suitable for measuring angular displacements around the Z and Y axes, specifically the azimuth and elevation axes. The angle around the X axis known as roll can be measured by the difference in the Z linear coordinate between the two alignment telescopes divided by the spacing between those telescopes. These alignment telescopes are also sensitive to azimuth and elevation angles. These effects can be subtracted out of the system by utilizing the azimuth and elevation angles available from the laser autocollimator. Thus all six degrees of freedom of station B, with respect to station A, can be measured and forwarded to the system processor.

Station B will also be equipped with a laser sensor package identical in concept to that shown for station A. Station B beams are then projected to retroreflectors mounted on the final end station or station C. By the same process as described for stations A and B, it is possible to measure the six degrees of freedom displacement of station C relative to station B. Thus, the true spatial attitude and displacement of the entire assembly can be determined at any instant in time. In this system described thus far, it is assumed that the relative deflections between the antenna stations will not exceed the dynamic ranges of the several instruments involved. Hence, a passive system is implied. However, in those applications where the deflections will be great, it is possible to provide actuators to close sensor loops in order to null the sensors involved. This too would provide the required positional information.

The preferred embodiment of this application utilized an IMU or equivalent space reference sensor unit in conjunction with electro-optical instruments to measure a complete state vector of displacements of a group of three or more pairs of longitudinally displaced radar antennas in a flexible vehicle environment. It differs from related prior art, i.e. the Benchless Laser, in that: (1) three or more stations are involved, (2) the support structures are configured for side-looking conformal arrays as opposed to fore/aft looking concavity mirrors, (3) the sensor complement is chosen for radar accuracy rather than optical system accuracy, and finally (4) the station support structures are not power driven to assume a position. Rather, the position is measured and then compensated for in the system.

BRIEF DESCRIPTION OF THE DRAWINGS

For a better understanding of the invention, reference may be had to the preferred embodiment exemplary of the invention shown in the accompanying drawings in which.

DESCRIPTION OF THE PREFERRED EMBODIMENTS

FIG. 1 is a pictorial view of an airplane 2 in flight mounted with the distributed antenna arrays 10. The pairs of distributed antenna arrays 10 are conformal in nature or are linear in nature with conformal radomes. Also shown in FIG. 1 are the six degrees of freedom or directional changes which must be observed for the distributed radar antenna array 10 mounted in the airplane 2. The directions are the linear mode X, Y and Z and the rotational modes elevaton, azimuth and roll.

FIG. 2 is a pictorial view of an airplane 2 in flight mounted with a conventional non-conformal radar array antenna 11. This non-conformal radar array antenna is mounted upon the surface of the airplane 2 and not embedded in or lying upon the surface of the airplane 2, thereby producing a significant amount of drag during flight. This drag during flight as produced by the non-conformal, non-distributed radar array antenna 11 results in a decrease in on-line time, meaning that the amount of time for which the plane has fuel required to perform its mission is decreased. This non-conformal radar array antenna 11 as shown on plane 2 would be utilized, for example, on the AWACS or E3A program.

FIG. 3 is an orthogonal view of the distributed antenna array location apparatus 5. This distributed antenna array location mechanism 5 comprises three stations. The first station 20 is mounted with two planar radar array antennas 10 and 10'. The radar array antennas 10 and 10' are held into place utilizing springs 11 and 11', respectively. The two radar array antennas 10 and 10' are mounted perpendicular to a support beam 21. These antennas 10 and 10' are parallel to each other and located opposite each other on the body of the host vehicle. Further, mounted at a midpoint of the support beam 21 is the the inertial measurement unit (IMU) 23 and a containment means 23' which contains the internal instrumentation for the first station. The second station 30 also comprises two radar array antennas 10 and 10' parallel one to another and perpendicular to a support beam 31. Mounted upon the support beam 31 is a containment means 33 which contains the instrumentation necessary for reflection of laser energy back to station 20 and the generation of laser energy and transmission of laser energy to the third station 40. Mounted opposite the first station 20 are four reflective means which reflects the laser energy generated and transmitted form the containment means 23'. These four reflective means are the first convex means 34, the planar means reflective means 35, the cube corner reflective means 36 and the second convex means 37. Finally, the third station shown on FIG. 3 is the third reflective station 40. This station again comprises two parallel radar array antennas 10 and 10', a connective means or support structure means 41 and a containment means to support the full reflective means 44, 45, 46 and 47. The four reflective means mounted upon containment means 43 comprise the first convex means 44, the planar means reflective means 45, the cube corner reflective means 46 and the second convex means 47.

FIG. 4 is a plan view of the inertial location mechanism 5. This mechanism is comprised of three stations with a first station 20 which in turn supports two parallel planar antenna arrays 10 and 10'. These planar antennas are held within the body of the host vehicle with springs 11 and 11' and further, these radar array antennas 10 and 10' are perpendicular to a support beam or means 21. Mounted also upon a midpoint of the support beam 21 is the (IMU) inertial measurement unit 23, the containment means 23' for the laser generating apparatus 22 and the light bending and splitting mirrors 28, 28', 28'', 29, 29' and 29''. During operation, station 20, utilizing the IMU structure 23, fixes upon a star in the heavens to serve as a true pointing indicia for the relative position of the first station 20 within the host vehicle. The laser generating apparatus 22 emits a laser beam. This laser beam first strikes a selectively transmissive first splitting reflective means 28. A portion of the laser beam energy is reflected to another reflective means, a non-dichroic, non-selectively transmissive reflector means 29. A predetermined portion or percentage of the laser beam energy not reflected to the reflective means 29 passes through the selectively transmissive first beam splitting reflector means 28 wherein this predetermined portion or percentage of laser beam energy strikes a second beam splitting selectively transmissive reflective means 28''. The portion of the laser energy which has struck the first bending reflective means 29 is fully reflected to a second splitting reflective means 28' which is selectively transmissive. The laser energy striking the selectively transmissive reflective means 28' is further split into a laser beam which will issue through the laser autocollimator 25 and a portion of the laser energy beam transmitted to a second non-selectively transmissive reflective means 29' is fully reflected through the first laser alignment telescope 24. The beam of laser energy which passes through the selectively transmissive dichroic means 28 is reflected by a second selectively transmissive non-dichroic means 28'' and is then directed through a laser interferometer 26. Finally, the predetermined percentage of laser energy which was not reflected by the selectively transmissive dichroic means 28'' passes to a third beam bending non-dichroic, non-selectively transmissive reflective means 29'' and is further directed through the second laser alignment telescope 27. The laser beam energy generated by the laser generating appartus 22 and selectively bent and reflected by the reflecting means 28, 28', 28'', 29, 29' and 29'' and passing through the first alignment laser telescope 24, the laser autocollimator 25, the laser interferometer 26 and the second laser alignment telescope 27 is reflected outside of the containment means 23' of the first station 20. The first laser alignment telescope means 24 directs a beam of energy towards a first convex reflective means 34. The laser autocollimator means 25 directs its energy beam towards the planar reflective means 35. The laser interferometer means 26 transmits its laser beam energy towards the cube corner reflective means 36 and the second alignment laser telescope means 27 emits its energy towards the second convex reflective means 37. The first and second convex means 34 and 37, the planar reflective means 35 and the cube corner reflective means 36 are all mounted upon the same optical axes as the first and second laser alignment telescopes 24 and 27, the laser autocollimator 25 and the laser interferometer 26. These reflective means are further mounted upon the second station 30. The second station 30 comprises two planar parallel antenna arrays 10 and 10' held in a position upon the host vehicle utilizing springs 11 and 11', respectively. A support struture 31 and a containment means 33 upon one side of the containment means 33 on the same optical axis as the electrical energy transmitting means 24, 25, 26 and 27 of station 20 directly opposed to these reflective means 34, 35, 36 and 37 on the opposite side of the containment 33 are further the second station alignment telescopes 44 and 47, the second station laser autocollimator 45 and the second station laser interferometer 46. Incorporated within the containment means 33 positioned upon the support structure 31 is a laser generating means 32. The laser energy generating means 32 issues forth a beam of laser energy which strikes the first laser beam splitting means 38. This selectively transmissive dichroic reflector means 38 is operable to permit a portion of the laser beam energy to be reflected onto a laser beam bending reflective means 39. The first laser beam bending means 39 then fully reflects the laser energy beam to a second station laser energy splitting selectively transmissive reflective means 38' which in turn reflects a portion of that laser energy through the laser autocollimator 45 and to a second laser energy beam bending means 39' which in turn transmits the fully reflected laser beam energy through a second station first alignment telescope means 44. After issuing from the laser generating apparatus 32, the laser beam energy strikes the selectively transmissive reflective means 38 and a secondary portion of the laser beam energy which then strikes a third laser energy beam splitting reflective means 38". A portion of the laser beam energy reflected from the laser energy beam splitting means 38" issues through the laser interferometer 46. Finally, a predetermined portion of the laser energy beam emitted from the laser generating appartus 32 passes through the first laser energy beam splitting reflective means 38 and through the third laser energy beam splitting means 38" and strikes a third laser energy beam bending reflective means 39" which in fact reflects the full amount of the remaining laser energy beam through the second station, second laser alignment telescope means 47. The laser energy which has been transmitted through the second station, first laser alignment telescope means 44, the second station laser autocollimator means 45, a second station laser interferometer means 46 and the second station, second laser alignment telescope means 47 reflects this energy towards a final or end station 40. The end station 40 again comprises the two parallel planar radar antennas 10 and 10' with accompanying springs 11 and 11' to support these antenna radar arrays 10 and 10' within the body of the host vehicle. Said radar array antennas are mounted parallel to each other and perpendicular to a support structure beam 41 and at the midpoint of said support structure is a containment means station 43 upon which is placed directly linear opposed to the second laser alignment telescope means 44, the second station laser autocollimator means 45, the second station laser interferometer means 46 and the second station laser alignment means 47 are four reflective means, the third station convex reflective means 54, the third station planar reflective means 55, the third station cube corner reflective means 56 and the third station second convex reflecive means 57. The alignment of the laser beams between the various laser emitting means and the laser reflective means determines the relative positions in six degrees of freedom for the various stations located upon a synchronous vehicle. The Z direction will be determined by the first laser alignment telescope located upon the first and second stations 20 and 30, respectively, 24, 27 and 44, 47. The azimuth and elevation for rotation about the various axes will be determined based upon the laser autocollimator upon the first station 20 and the second station 30, 25 and 45, respectively. The linear direction X will be determined by a laser interferometer directing its energy from the first to the second, finally to the third station (20, 30 and 40) utilizing the laser interferometer 26 and 46, respectively, and finally, the linear directions Y and Z and the rotation about the X axis roll R will be determined utilizing the second laser alignment telescope means 24, 27 and 44, 47 as located upon the first and second station 10 and 30, respectively.

Figures 5A, 5B:
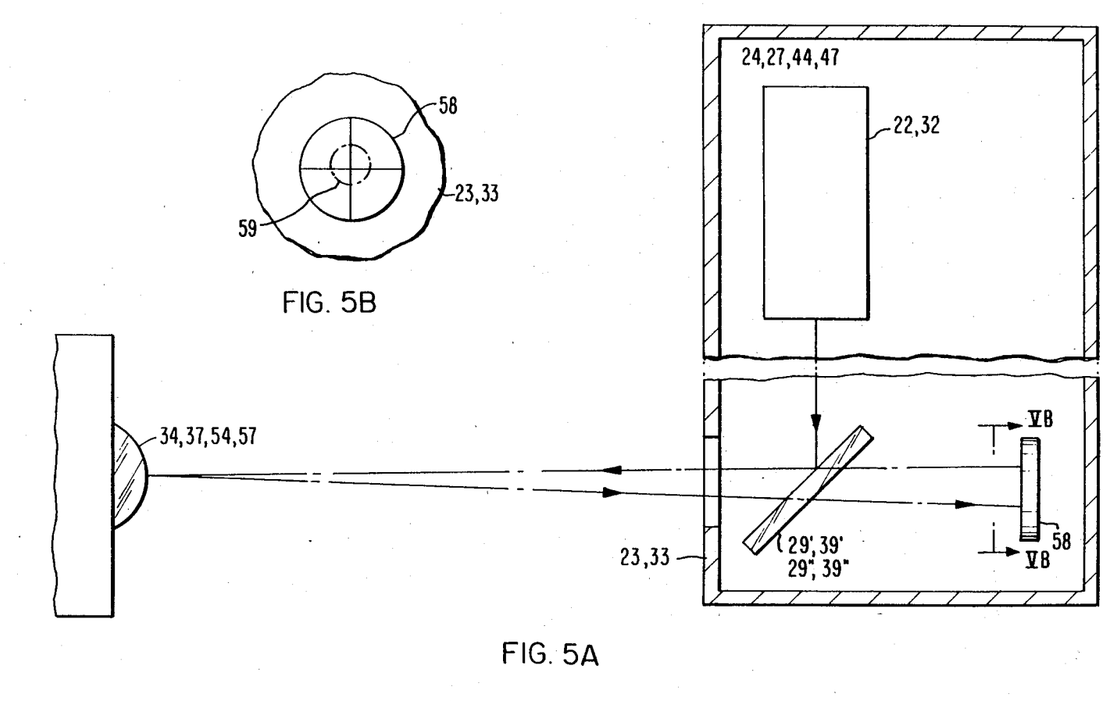
FIG. 5A is a plan view of the alignment telescope.
FIG. 5B is a cross-section of the photosensitive screen utilized in the alignment telescope.

FIG. 5A is a plan view of the first and second laser alignment telescope means as will be utilized on the first and second stations 20 and 30. This will cover the laser alignment telescope means 24, 27, 44, 47. The laser alignment telescope means 24, 27, 44, 47 comprises a laser generating means 22, 32 emitting a laser beam eventually to a reflecting means 29', 29", 39', 39". This reflecting means bounces the energy from the laser beam to a convex reflective means 34, 37, 54, 57 mounted on 33 and 43, respectively. In its passage from reflecting means 29', 39', 29", 39" to convex reflecting means 34, 37, 54, 57 the laser beam passes through transmitting-reflecting means 29'" with good transmission efficiency. After impinging upon convex reflecting means 34, 37, 54, 57, the laser beam bounces back to the transmitting-reflecting means 29'" whereupon it is diverted to the photosensitive cell 58.

As shown in FIG. 5B the photosensitive cell 58 has four quadrants each of which is capable of independently producing an electrical signal proportional to the amount of laser energy impinging upon it. Thus the percentage of light which strikes the various quadrants of the photosensitive cell 58 in the form of the reflected laser beam 59 will indicate the alignment or misalignment of the station due to the misalignment of reflection from the convex means 34, 37, 54, 57.

Figure 5C:
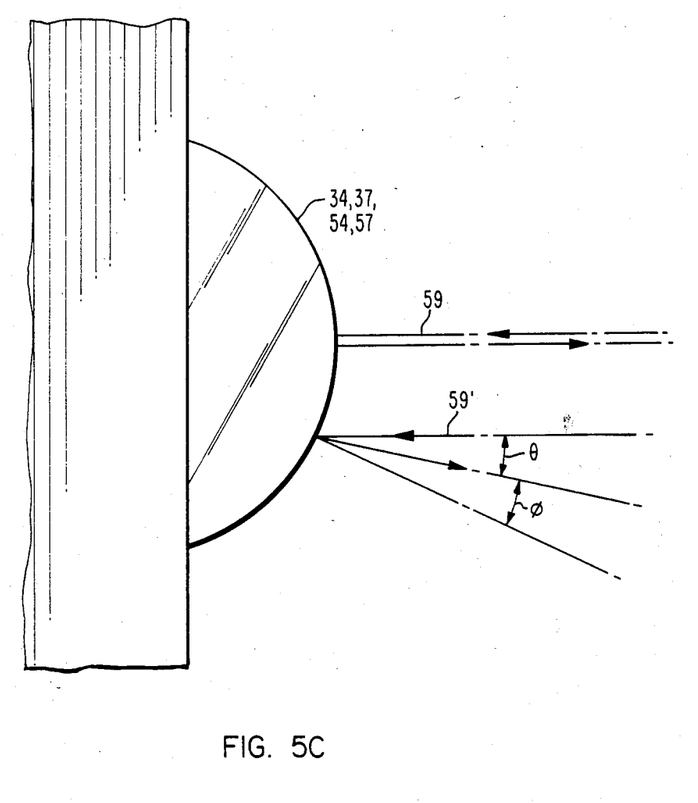
FIG. 5C is a cross-section of the convex reflector utilized in the alignment telescope.

FIG. 5C is a cross-section of the convex reflected means 34, 37, 54, 57 demonstrating the direct reflection of the laser beam 59 and in 59', the reflection of the laser beam 59' at an angle whereby $\theta$ is the angle of reflection and $\theta$ is the angle of incidence. The angle of reflection and the angle of incidence would be calculatable based upon the amount of electrical energy as shown from the photosenstive cell 58.

Figures 6A, 6B:
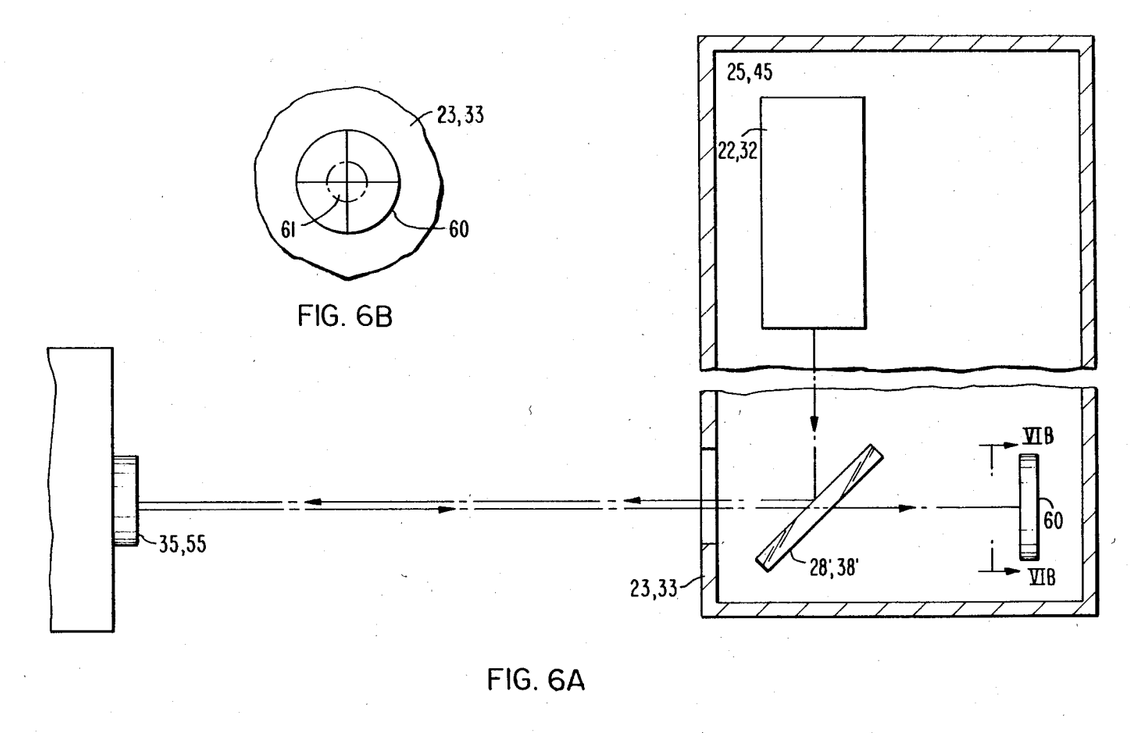
FIG. 6A is a plan view of the laser autocollimator.
FIG. 6B is a cross-sectioned view of the photosensitive receptor utilized in the laser autocollimator.

FIG. 6A is a plan view of the laser autocollimator 25 and 45 as it would be seen in operation on the first and second stations 20 and 30, respectively. The laser autocollimator 25, 45 comprises a laser energy generating means 22, 32 whereby a laser beam will strike a reflecting means 28', 38' and will be reflected out from the laser autocollimator 24, 25 to strike a planar reflecting means 35, 55. In its passage from reflecting means 28', 38' to planar reflecting means 35, 55 the laser beam passes through transmitting-reflecting means 28'"with good transmission efficiency. After impinging upon planar reflecting means 35, 55 the laser beam bounces back to the transmitting-reflecting means 28'" whereupon it is diverted to the photosensitive cell 60.

As shown in FIG. 6B the photosensitive cell 60 has four quadrants each of which is capable of independently producing an electrical signal proportional to the amount of laser energy impinging upon it. Thus the percentage of light which strikes the various quadrants of the photosensitive cell 60 in the form of the reflected laser beam 61 will indicate the angular alignment of misalignment of the station due to the misalignment of reflection from the planar reflecting means 35, 55.

Figure 7:
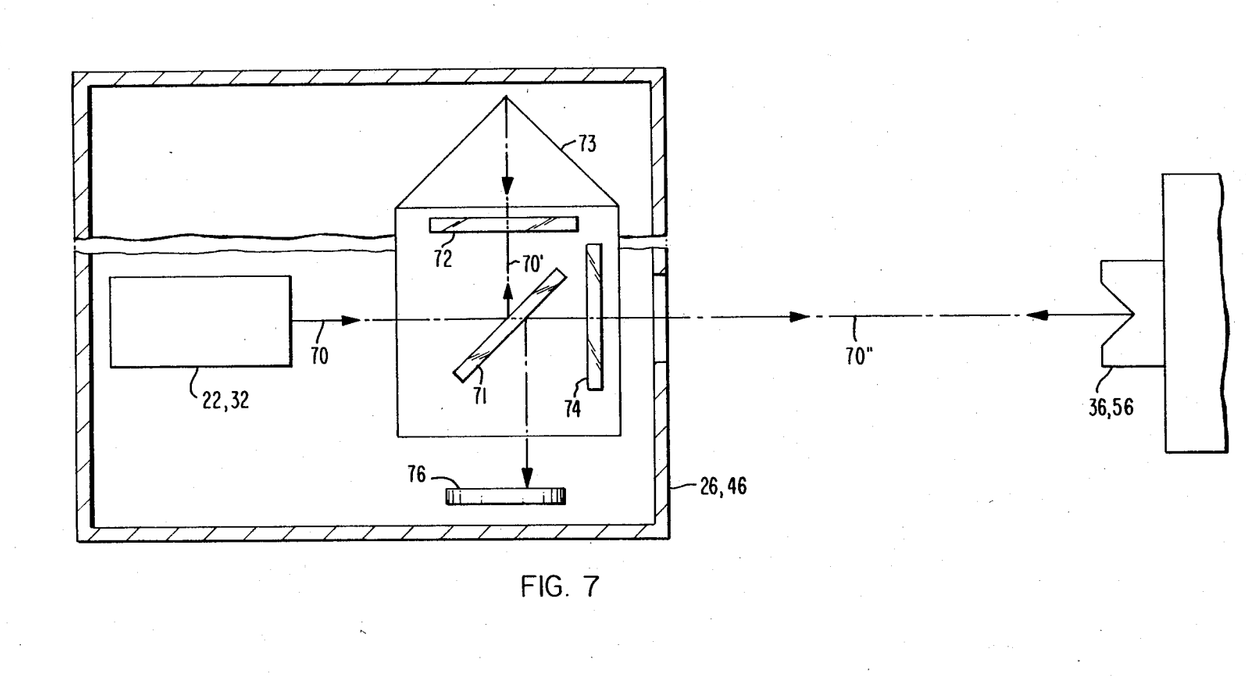
FIG. 7A is a plan view of the laser interferometer.

FIG. 7 is a laser interferometer 26, 46. As found in the first station 20, it is a director of light energy from the laser generating device 22 and is also found on the second station 30. Its construction and operating principles are well known in the art and involve modifications of the Michelson interferometer.

Part of the input beam 70 is reflected upward by the coated glass beam splitter 71 to pass through the polarizing quarter wave plate 72 and then is reflected back along itself by cube corner reflector 73 passing through the beam splitter 71 to the photodetector cell 76. This forms a reference path 70' to which the measurement path is compared. Part of the light energy in beam 70 passes through the coated glass beam splitter 71 and then through the polarizing quarter wave plate 74 to impinge upon the measurement cube corner retroreflector 36, 56. It is then reflected back along itself to interact with the reference beam at the surface of the coated glass beam splitter 71. This forms a measurement path 70" to be compared with the aforementioned reference path 70'. Energy from the measurement path 70" is combined with energy from the measurement path 70' by reflection from the beam splitter 71. These combined beams then impinge upon the photodetector cell 76. The motion of measurement retroreflector 36, 35 causes a variation of the optical frequency of the energy reaching the detector 76. This is a manifestation of the Doppler shift associated with moving bodies which reflect wave energy while in motion. This Doppler frequency variation of the optical energy reaching detertor 76 is electronically integrated to yield an electrical signal proportional to the displacement of the measurement retroreflector 36, 56.

Numerous variations may be made in the abovedescribed combination and in different embodiments of this invention. They may be made without departing from the spirit thereof. Therefore, it is intended that all matter contained in the foregoing description and in the accompanying drawings shall be interpreted as illustrative and therefore not in a limiting sense.

We claim:

1. A laser alignment displacement measurement apparatus for measuring a comprehensive state of vector displacements between a group of at least two pairs of longitudinally spaced side-looking radar arrays in a flexible host vehicle environment, said apparatus operating to measure three linear translation motions defined as X, Y and Z wherein X is horizontal and aligned with the longitudinal axis of the flexible host vehicle, Y is vertical and is at right angles to X, and Z is horizontal and at right angles to X, said apparatus also operating to measure three rotational translations defined as azimuth, elevation and roll wherein azimuth is the angular displacement around Z, elevation is the angular displacement around Y, and roll is the angular displacement around X, said apparatus comprising:

at least two pairs of side-looking radar arrays positioned proximate the sides of said host vehicle, each pair of radar arrays rigitdly joined to each other by rigid support means spanning the width of said host vehicle, one of each of said pair of radar arrays comprising the reference radar array and having affixed thereto an inertial measurement unit means which is operable to provide a true pointing indicia relative to a star-fixed location, and a laser source affixed to said reference radar array and said laser source operable to project a laser beam along the reference Z direction;

a first fixed beam splitting reflective means, intersecting said laser beam and pasing a predetermined part of said laser beam uninterrupted to a fixed second beam splitting reflective means, said fixed second beam splitting reflective means which passes a predetermined part of said laser beam to a first fixed beam bending reflective means, the predetermined part of said laser beam reflected by said first beam splitting reflective means passing to a second fixed beam bending reflective means, then said predetermined part of said laser beam passing uninterrupted through a third fixed beam bending reflective means;

the predetermined unreflected part of said laser beam reflected by said first beam bending reflective means and said third beam bending reflective means passing through an alignment telescope means, said predetermined unreflected part of said laser beam reflected by said second beam splitting reflective means and a third beam splitting reflective means, respectively, passing through a laser interferometer means and a laser autocollimator means;

the other of each of said pair of radar arrays having affixed thereto convex reflector means positioned to receive said predetermined unreflected part of said laser beam from said alignment telescope means of said reference radar array, a planar reflective means affixed to said other pair of radar arrays and positioned to receive said predetermined unreflected part of said laser beam from said laser autocollimator means, and cube corner reflector means affixed to said other pair of radar arrays and positioned to receive said predetermined unreflected part of said laser beam from said laser interferometer means; and said predetermined unreflected part of said laser beam received by said alignment telescope means providing a measurement of any translations in the Y and X directions as well as roll about said X axis, said predetermined unreflected part of said laser beam received by said laser autocollimator providing a measurement of any angular displacements in the Y and Z axes which are said displacements in azimuth and elevation, and said laser beam received by said laser interferometer means providing a measurement of the relative displacement in said X direction.

2. The laser alignment displacement measurement apparatus as in claim 1, where said inertial measurement unit is a gyroscopic device utilizing a star-fixed location.

3. The laser alignment displacement measurement apparatus as in claim 1, wherein said first fixed beam splitting reflective means are selectively transmissive dichroic planar mirrors.

4. The laser alignment displacement measurement apparatus as in claim 1, wherein said first fixed beam bending reflective means are non-dichroic, non-selectively transmissive planar mirrors.

5. The laser alignment displacement measurement appartus in claim 1, wherein said flexible host vehicle environment is an aircraft having at least two conformal radar arrays mounted into the flexible skin fuselage of said aircraft.

6. The laser alignment displacement measurement apparatus as in claim 1, wherein said flexible host vehicle environment is a floating vehicular means operating upon a body of water, said floating vehicular means having mounted upon its surface skin at least two conformal radar arrays.

7. The laser alignment displacment measurement apparatus as in claim 1, wherein said second fixed beam splitting reflective means are selectively transmissive dichroic planar mirrors.

8. The laser alignment displacement measurement apparatus as in claim 1, wherein said second fixed beam bending reflective means are non-dichroic, non-selectively transmissive planar mirrors.

9. The laser alignment displacement measurement apparatus as in claim 1, wherein said third fixed beam bending reflective means are non-dichroic, non-selectively transmissive planar mirrors.

10. The laser alignment displacement measurement apparatus as in claim 1, wherein said third fixed beam splitting reflective means are selective transmissive dichroic planar mirrors.

* * * * *